(12) United States Patent
Wendte et al.

(10) Patent No.: US 9,730,379 B2
(45) Date of Patent: *Aug. 15, 2017

(54) MULTIPLE SEED-TYPE SEED METER (71) Applicant: CNH Industrial America LLC, New Holland, PA (US)

(72) Inventors: Keith W. Wendte, Willowbrook, IL (US); Brian T. Adams, Centralia, MO (US); Jason T. Czapka, Munster, IN (US)

(73) Assignee: CNH Industrial America LLC, New Holland, PA (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/300,640

(22) Filed: Jun. 10, 2014

(65) Prior Publication Data
US 2015/0351315 A1    Dec. 10, 2015

(51) Int. Cl.
*A01C 7/04* (2006.01)
*A01C 7/12* (2006.01)
(Continued)

(52) U.S. Cl.
CPC ............ *A01C 7/082* (2013.01); *A01C 7/046* (2013.01); *A01C 7/12* (2013.01); *A01C 7/123* (2013.01); *A01C 7/20* (2013.01); *A01C 19/02* (2013.01); *A01C 21/00* (2013.01); *A01C 21/005* (2013.01); *A01C 7/128* (2013.01)

(58) Field of Classification Search
CPC .... A01C 7/12; A01C 7/08; A01C 7/00; A01C 7/123; A01C 7/20; A01C 19/02; A01C 19/00; A01C 21/00; A01C 7/128; A01C 7/127; A01C 7/046; A01C 7/044; A01C 7/042; A01C 7/04; A01C 7/082; A01C 7/081; A01C 21/005
See application file for complete search history.

(56) References Cited

U.S. PATENT DOCUMENTS 3,731,842 A    5/1973  Schlegel
4,779,765 A   10/1988  Neumeyer
(Continued)

FOREIGN PATENT DOCUMENTS

WO    WO2013119459    8/2013

OTHER PUBLICATIONS

Raven multi-variety planter; Farming Industry News; http://farmindustrynews.com/planters/closer-look-industry-s-first-multi-hybrid-planter?NL=FIN-02&Issue=FIN-02_20130614_FIN-.
(Continued)

*Primary Examiner* — Christopher J Novosad
(74) *Attorney, Agent, or Firm* — Rebecca L. Henkel; Rickard K. DeMille (57) ABSTRACT

A seed meter is provided for planting multiple types of seed and rapidly switching between the types being planted in a single planting pass of a planting session of row-crop planting. The seed meter has a split seed meter reservoir with a pair of seed meter chambers flanked by or next to a pair of seed disks. Activation and deactivation of the seed disks within the seed meter are synchronized to selectively deliver one type of seed from one of the seed meter chambers for delivery out of a single seed tube of the seed meter, which may provide absolute and instantaneous on-the-go seed switching within a single row from each seed meter.

5 Claims, 8 Drawing Sheets (51) Int. Cl.
*A01C 7/20* (2006.01)
*A01C 19/02* (2006.01)
*A01C 21/00* (2006.01)
*A01C 7/08* (2006.01)

(56) References Cited

U.S. PATENT DOCUMENTS

| | | | |
|---|---|---|---|
| 5,915,313 | A | 6/1999 | Bender et al. |
| 5,927,217 | A | 7/1999 | Halford et al. |
| 6,193,175 | B1 | 2/2001 | Andersson et al. |
| 6,401,638 | B1 | 6/2002 | Crabb et al. |
| 6,845,724 | B2 | 1/2005 | Mayerle et al. |
| 7,353,760 | B2 | 4/2008 | Mayerle et al. |
| 8,322,293 | B2 | 12/2012 | Wollenhaupt et al. |
| 8,543,238 | B2 | 9/2013 | Straeter |
| 8,942,894 | B2 | 1/2015 | Garner et al. |
| 8,948,980 | B2 | 2/2015 | Garner et al. |
| 2011/0178632 | A1* | 7/2011 | Straeter .................. A01C 7/10 700/219 |
| 2014/0165890 | A1 | 6/2014 | Graham |
| 2014/0174330 | A1 | 6/2014 | Garner et al. |
| 2015/0059629 | A1 | 3/2015 | Kinzenbaw et al. |

OTHER PUBLICATIONS

Kinze multiple variety planter; website; http://www.kinze.com/article.aspx?id=167
&Kinze+Announces+the+World%27s+First+Electric+Multi+Hybrid+Concept+Planter.

* cited by examiner

MULTIPLE SEED-TYPE SEED METER

FIELD OF THE INVENTION

The invention relates generally to row-crop planters or seeders and, in particular, to seed meters of planters for planting multiple varieties of seed.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have performance inconsistencies between different areas. That is because a field can have a wide variety of soil types and management zones such as irrigated and non-irrigated zones in different areas. Seed companies are developing multiple varieties of each of their seed product types, with the different varieties offering improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include two separate and distinct seed meters at every row unit.

SUMMARY OF THE INVENTION

The present invention is directed to a seed meter that allows for absolute and instantaneous switching seed types being planted during a single planting pass, without requiring multiple seed meters at every row unit or emptying out or planting out a first seed type before switching to a different seed type. The seed meter has more than one seed disk in its housing for selectively planting one of multiple seed types. The seed meter is configured to activate a single seed disk and deactivate the others so that only seeds conveyed by the activated seed disk are delivered out of the seed meter for planting at a given time. By on-the-move synchronizing of activating and deactivating of the different seed disks within the seed meter, an absolute and instantaneous switching of the seed type being planted within a single row is achieved.

According to one aspect of the invention, a seed meter is provided for planting multiple types of seed in a single planting pass during row-crop planting of an agricultural field. The seed meter has a housing supported relative to a row unit of a planter. A first seed disk is rotatable within the housing for conveying seeds of a first type through the housing and out of the seed meter. A second seed disk is rotatable within the housing for conveying seeds of a second type through the housing and out of the seed meter. The first and second seed disks may be parallel to or angled with respect to each other. A seed disk drive system activates and deactivates the first and second seed disks for selectively delivering a corresponding one of the first and second seed types out of the housing for planting of an agricultural field. This allows a producer to plant multiple varieties of seed within the same field in a single planting session and even during a single planting pass without having to add additional row units or seed meters.

According to another aspect of the invention, the seed meter has a seed meter reservoir with a first seed chamber storing seeds of the first type within the housing for receipt by the first seed disk when the first seed disk is activated. A second seed chamber stores seeds of the second type within the housing for receipt by the second seed disk when the second seed disk is activated. A separator wall within the seed meter reservoir may separate the first and second seed chambers from each other. The separator wall may be arranged transversely between the first and second seed disks with the first seed chamber between the separator wall and the first seed disk and the second seed chamber between the separator wall and the second seed disk. Separate primary seed conduits may direct separately stored seed types from bulk storage into the seed chambers of the seed meter, which may include delivery of the seed from bulk storage into compartments of an on-row storage system which may be defined by a vented mini-hopper(s) that feeds the seed chambers of the seed meter. In another embodiment, a seed gate system(s) is arranged to selectively direct seeds of different types through a single primary seed conduit into different seed chambers of the seed meter, for example, by way of the compartments of the mini-hopper(s). In yet another embodiment, the on-row compartments provide the bulk storage of the different types of seed which are gravity-fed into the seed chambers of the seed meter.

According to another aspect of the invention, the first and second seed disks are arranged generally parallel to each other. A single seed tube may receive seeds released from both the first and second seed disks for delivery onto the agricultural field. This provides a single unitary seed meter of relatively simple construction that can offer on-the-move absolute and instantaneous switching of the seed type being planted during a single planting pass.

According to another aspect of the invention, the first and second seed disks are arranged at an angle with respect to each other. This provides a seed meter housing that encloses multiple seed disks that each releases seed at substantially the same seed release location within the seed meter housing for delivery out of a seed tube, which reduces seed bounce within the seed tube.

According to another aspect of the invention, the housing of the seed meter has a first side portion and a second side portion. A first seed disk assembly is arranged within the first side portion of the housing for rotatably conveying individual seeds of a first type through the housing and out of the seed meter for individually planting the seeds of the first variety during row-crop planting of an agricultural field. A second seed disk assembly is arranged within the second side portion of the housing for rotatably conveying individual seeds of a second type through the housing and out of the seed meter for individually planting the seeds of the second variety during row-crop planting of the agricultural field. This allows for planting multiple varieties of seed within the same field without having to add additional row units or seed meters.

According to another aspect of the invention, each of the first and second seed disk assemblies includes a seed disk rotatable within a cavity defined by the respective one of the first and second side portions of the housing. A seed disk drive system may selectively rotate the seed disks of the first and second seed disk assemblies independently with respect to each other. This allows for quick switching or changeovers from planting seeds of a first seed type to planting seeds of a second seed type.

According to another aspect of the invention, the seed disk drive system includes a clutch arranged with respect to each of the first and second seed disk assemblies. Each clutch selectively engages/disengages transmission of a rotation driving power to the respective seed disk for permitting/preventing rotation of the corresponding seed disk of the first and second seed disk assemblies. The clutch may be an air clutch or an electromechanical clutch. This allows for a seed meter capable of delivering multiple types of seed by activating and/or deactivating multiple seed disks within the seed meter.

According to another aspect of the invention, the seed disk drive system includes a motor drive at each of the first and second seed disk assemblies. A controller controls the motor drive(s) to permit/prevent transmission of a rotation driving power to the seed disks. In this way, rotation of one of the seed disks, a deactivated seed disk, can be stopped while the other seed disk, an activated seed disk, is rotated. The motor drive may be a pneumatic motor or an electric motor. This allows for a seed meter capable of delivering multiple types of seed by activating and/or deactivating multiple seed disks within the seed meter.

According to another aspect of the invention, the seed meter has a seed tube that receives seeds released from both the first and second seed disk assemblies for delivery onto the agricultural field. This allows for sequentially delivering different types of seed from a single seed meter into a single seed bed.

According to another aspect of the invention, a method of planting multiple types of seed in a single planting pass during planting of an agricultural field is provided. The method includes rotating a first seed disk in a seed meter to convey seeds of a first type through the seed meter and deliver the seeds of the first type onto a first location of an agricultural field. A second seed disk is rotated in the seed meter to convey seeds of a second type through the seed meter and deliver the seeds of the second type onto a second location of the agricultural field. The first seed disk may be arranged within a housing of the seed meter to rotate past a first seed chamber storing seeds of the first type within the housing of the seed meter. The second seed disk may be arranged within the housing to rotate past a second seed chamber storing seeds of the second type within the housing of the seed meter. An instantaneous switchover can be made from planting seeds of the first type to planting seeds of the second type. This can be done by deactivating the first seed disk and activating the second seed disk seed-type switching event. During the seed-type switching event, release of a final seed of the first seed type is sequentially followed by an initial seed of the second seed type. This can be done within a single row without creating a skip event. This provides maintaining a constant in-row seed spacing through the seed-type switching event, whereby an in-row seed spacing at a transition between the first and second seed types is the same as the in-row seed spacing within each of the first and second seed types.

According to another aspect of the invention, each seed meter of a planter may be individually controlled to control switching from delivering seeds of the first seed type to delivering seeds of the second seed type on a per-row basis. Different groups of seed meters corresponding to different sections of a planter may be separately controlled to control switching from delivering seeds of the first type to delivering seeds of the second seed type from the planter on a per-section basis. All seed meters of the planter may be simultaneously controlled to control switching from delivering seeds of the first seed type to delivering seeds of the second seed type on a whole-planter basis. This allows for different versions of seed variety switchover control based on the amount of precision or pinpoint control needed for different seed variety placements within different fields or based on producer/operator preference.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
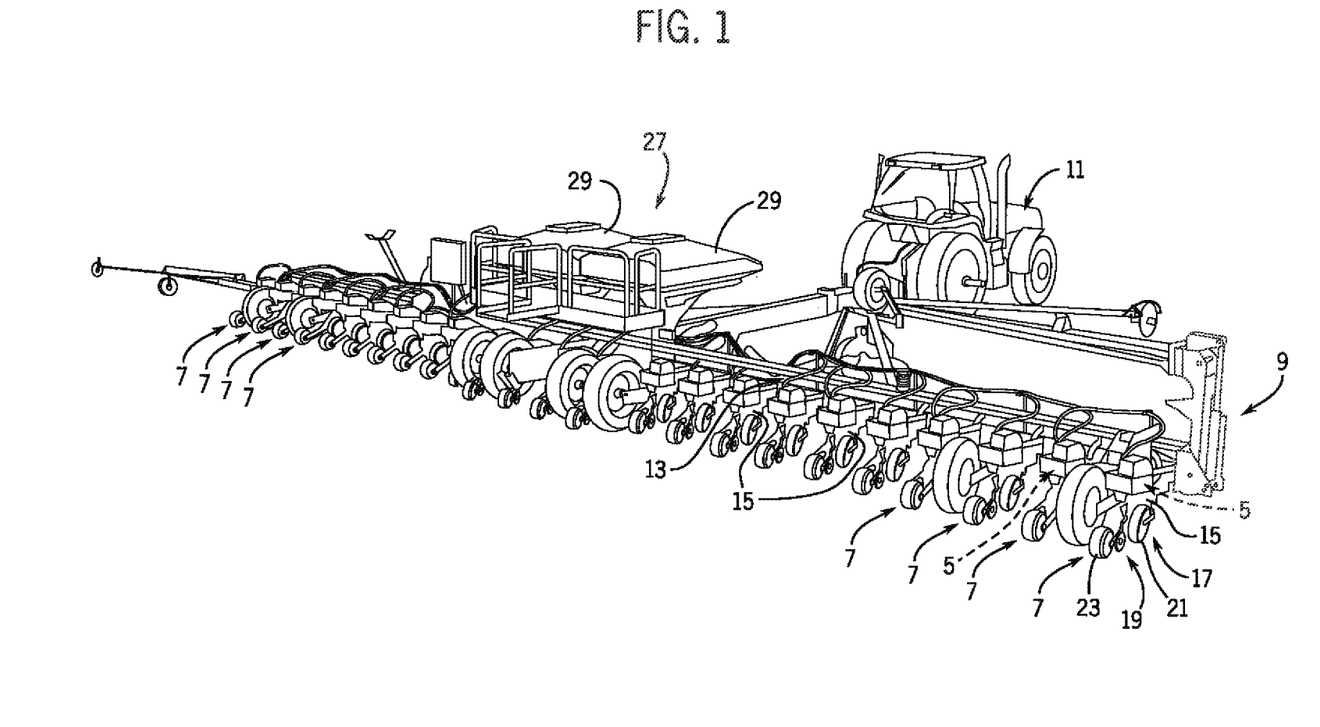
FIG. 1 illustrates a pictorial view of a planter incorporating a seed meter in accordance with the present invention.
Figure 2A:
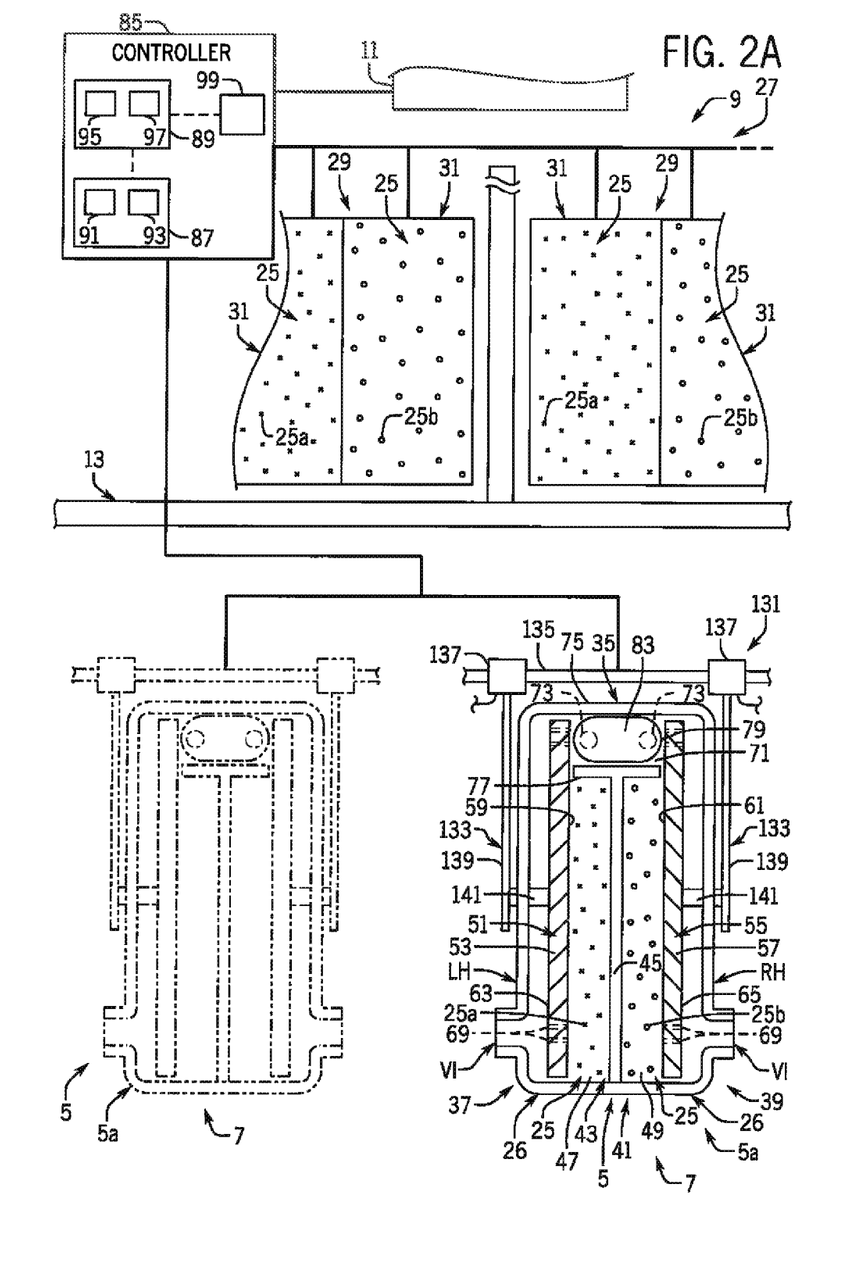
FIG. 2A illustrates a simplified schematic view of the planter of FIG. 1 and cross-sectional representation of a seed meter in accordance with the present invention.
Figure 2B:
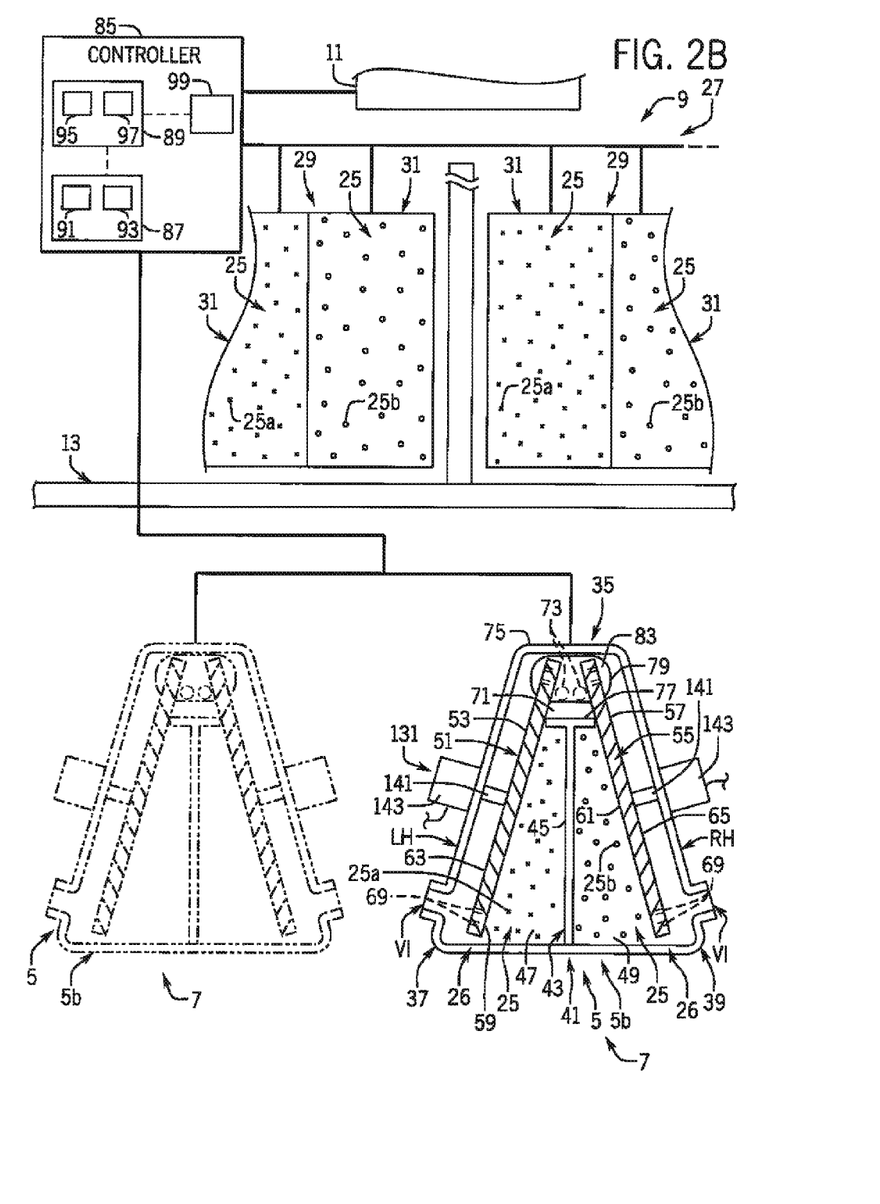
FIG. 2B illustrates a variant of the seed meter of FIG. 2A.
Figure 2C:
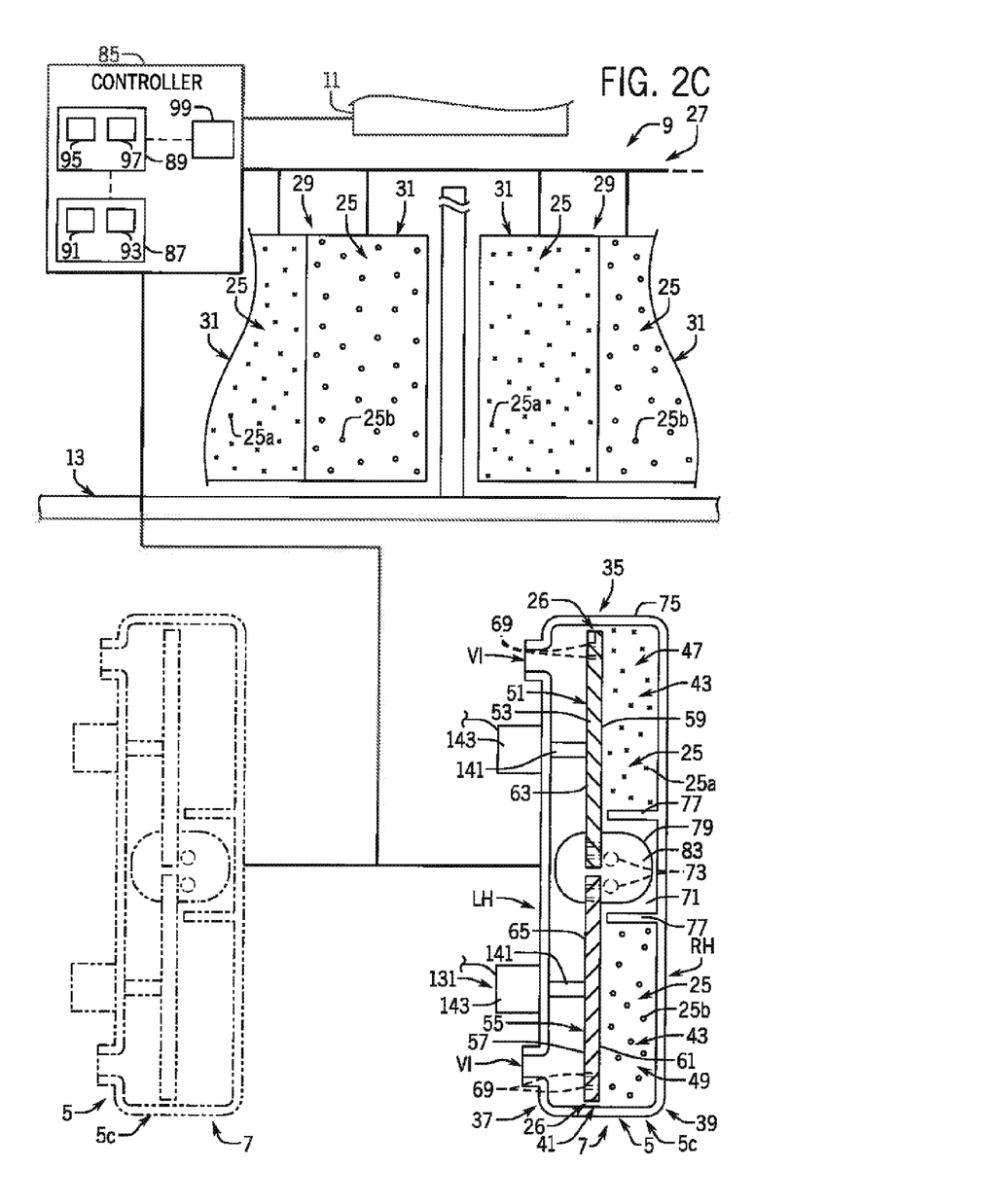
FIG. 2C illustrates another variant of the seed meter of FIG. 2A.

Referring now to the drawings and specifically to FIG. 1 and the simplified schematic representations of FIGS. 2A-2C, seed meters 5 of row units 7 of a planter 9 are configured for planting multiple types or varieties of seed. As explained in greater detail elsewhere herein, each seed meter 5 can switch, for example, absolutely, instantaneously, and automatically, between planting of different types or varieties of seed during a single planting pass of row-crop planting of an agricultural field with the planter 9. Planter 9 may be one of the EARLY RISER® series planters available from Case IH and is typically pulled by a traction device such as a tractor 11. The planter 9 has a frame 13 that supports the multiple row units 7 that are substantially identical. Each row unit 7 includes a respective seed meter 5 and various support components for supporting the seed meter 5 and corresponding ground-engaging components.

Referring now to FIG. 1, such support components include a sub-frame 15 that is connected to the frame 13 of the planter 9 by way of a parallel linkage system 16 (FIG. 5) and supports the seed meter 5 and furrow opening 17 and closing mechanisms 19 toward front and back ends of the row unit 7. The opening and closing mechanisms 17, 19 may include opener disks and closing disks, respectively, or other ground-engaging tools for opening and closing a furrow. Each row unit 7 may include a gauge wheel 21 configured for adjusting furrow depth by limiting soil penetration of the furrow-opening mechanism 17 while creating a furrow, and a press wheel 23 may be arranged to roll over the closed furrow to firm the soil over the seed to further close the furrow and promote favorable seed-to-soil contact.

Referring now to FIGS. 2A-2C, in these embodiments, seeds 25 are held in bulk storage in a bulk storage system 27 with at least one bulk fill hopper 29, shown here in each of FIGS. 2A-2C as having two central bulk fill hoppers 29 supported by the frame 13 of the planter 9. The bulk storage system 27 has multiple compartments 31, shown here as spaces within each of the bulk-fill hoppers 29 that are separated by divider walls or partitions 33. In another embodiment, the compartments 31 are defined by separate and discrete containers themselves, such as the bulk fill hoppers 29. In another embodiment, such as that shown in FIG. 5, at least some of the bulk fill hoppers 29 are not centrally located with respect to the planter 9 and remote from the row units 7, but are mounted on the row units 7 themselves in a gravity-feed relationship with the respective seed meters explained in greater detail elsewhere herein. Regardless of where the hoppers 29 are located, the different compartments 31 of the hoppers 29 may hold seeds 25 of a common plant type but different varieties or types 25a, 25b for planting in different type or variety zones of an agricultural field defined at least in part by characteristics relating to at least one of soil type and management type. Although the seed 25 may be described elsewhere herein as different types 25a, 25b, it is understood that the description of the different types includes different varieties. In other words, the different types 25a, 25b of seed 25 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products.

Still referring to FIGS. 2A-2C, three exemplary arrangements of seed meters 5 are shown in the three row units 7 as seed meters 5a, 5b, and 5c, in FIGS. 2A, 2B, and 2C, respectively, each of which can plant multiple types or varieties of seed. Each seed meter 5 has a pair of metering assemblies 26 for singulating and selectively delivering different types 25a, 25b of seed 25 from the seed meter 5. The seed meter 5a of FIG. 5A and the seed meter 5b in FIG. 2B have transversely arranged metering assemblies 26. The seed meter of FIG. 2C has longitudinally arranged metering assemblies 26. Regardless of whether the metering assemblies 26 are arranged transversely or longitudinally and referring again to FIGS. 2A-2C, each seed meter 5 is operably connected to an airflow system 34 (FIG. 4) that includes a positive air pressure source and a vacuum source for establishing positive and vacuum pressures and corresponding air flows for delivery seed 25 to the seed meters 5 and for moving the seeds 25 through the seed meter 5. The positive air pressure source and vacuum sources can be known pumps, fans, blowers, and/or other known airflow system components. Each seed meter 5 has a housing 35 defining the first and second side portions 37, 39 shown as including a left-hand cover (LH) and a right-hand cover (RH). In the seed meters 5a, 5b of FIGS. 2A-2B with the transversely arranged metering assemblies 26, each of the left-hand and right-hand covers LH, RH has a vacuum inlet (VI) for connecting the first and second side portions 37, 39 to the vacuum source. In the seed meter 5c of FIG. 2C with the longitudinally arranged metering assemblies 26, the left-hand cover LH is shown with two vacuum inlets (VI) for connecting the first side portion 37 to the vacuum source at two locations. An intermediate portion 41 of the housing 35 is arranged between the first and second side portions 37, 39. A seed meter reservoir 43 defining a multiple chamber or split reservoir is arranged within the intermediate portion 41 of the housing 35. In the seed meter 5c of FIG. 2C with the longitudinally arranged metering assemblies 26, the reservoir 43 extends from the intermediate portion 41 into the second side portions 39 of the housing 35. In the seed meters 5a, 5b of FIGS. 2A-2B with the transversely arranged metering assemblies 26, a separator wall 45 within the seed meter reservoir 43 separates the seed meter reservoir into a first seed chamber 47 storing seeds of the first type 25a and a second seed chamber 49 storing seeds of the second type 25b within seed meter housing 35.

Figure 3:
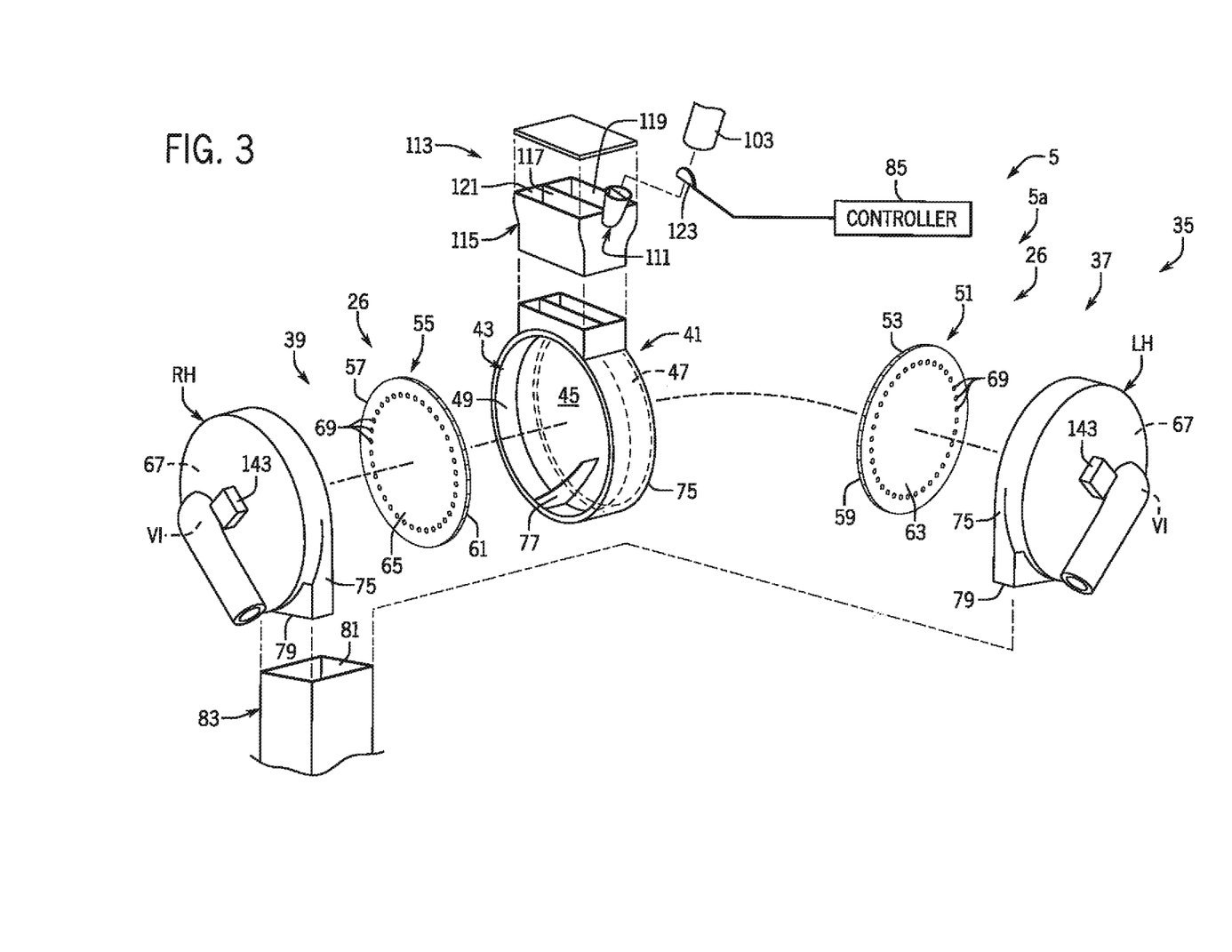
FIG. 3 illustrates an exploded pictorial view of a variant of the seed meter of FIG. 2A.

Referring now to FIGS. 2A, 2B, and 3, in the seed meters 5a, 5b with the transversely arranged metering assemblies 26, one of the metering assemblies 26 includes a first seed disk assembly 51 having a first seed disk 53 arranged within the first side portion 37 of the seed meter housing 35. The other metering assembly 26 includes a second seed disk assembly 55 having a second seed disk 57 arranged within the second side portion 39 of the seed meter housing 35. Inwardly facing surfaces 59, 61 of the first and second seed disks 53, 57 face toward and define transverse outer peripheries of the first and second seed chambers 47, 49. Outwardly facing surfaces 63, 65 of the first and second seed disks 53, 57 face toward and are spaced from the left-hand and right-hand covers LH, RH of the first and second side portions 37, 39. This provides vacuum pressure chambers 67 between the outwardly facing surface 63 and the left-hand cover LH in between the outwardly facing surface 65 and right-hand cover RH as imparted by the negative pressure airflow through vacuum inlets VI of the left-hand and right-hand covers LH, RH of the seed meter housing first and second side portions 37, 39. The vacuum pressure in the vacuum pressure chamber 67 allows seeds 25 to be drawn and held against the seed pockets and/or holes 69 (FIG. 3) of the seed disks 53, 57 to rotatably convey the seeds 25 through the seed meter housing 35 to be released from the seed disk(s) 53, 57 within a discharge segment 71 (FIG. 2A-2B) at release locations 73 in the seed meter housing 35. The discharge segment 71 is defined between a forward facing wall 75 of the seed meter housing 35, the inwardly facing surfaces 59, 61 of the seed disks 53, 57, and a divider wall 77. The divider wall 77 extends in a transverse direction through the interior of the housing 35, across a front of the seed meter reservoir 43, and between the seed disks 53, 57.

Referring now to FIG. 2C, the above description of the seed meters 5a, 5b of FIGS. 2A-2B with the transversely arranged metering assemblies 26 applies to the seed meter 5c of FIG. 2C with the longitudinally arranged metering assemblies 26, while differing in the following ways. In the seed meter 5c with the longitudinally arranged metering assemblies 26, there is no separator wall 4 and the left-hand cover LH has two vacuum inlets VI aligned with the first and second seed disk assemblies 51, 55. The first and second seed chambers 47, 49 are spaced from each other at front and back ends of the seed meter 5c, respectively, with a pair of divider walls 77 and the discharge segment 71, longitudinally separating the first and second seed chambers 47, 49.

Referring again to FIG. 2, the seed meter 5a has its seed disk assemblies 51, 55 and seed disks 53, 57 transversely aligned and arranged parallel to each other. As shown in FIG. 2B, the seed meter 5b has its seed disk assemblies 51, 55 and seed disks 53, 57 transversely aligned and arranged at an angle with respect to each other, whereby axes of rotation of the seed disks 53, 57 intersect to define an included angle of less than 180°. This embodiment shows the axis of rotation of the seed disks 53, 57 of seed meter 5b with an angle of about 30°, and the seed meter housing 35 defining a tapering width providing a generally V-shaped cross-sectional configuration. When comparing the two embodiments of the seed meters 5a, 5b of FIG. 2A-2B with the transversely arranged metering assemblies 26, the V-shaped seed meter 5b (FIG. 2B) with the angled seed disks 53, 57, has release locations 73 that are longitudinally aligned and transversely spaced and relatively closer to each other than the longitudinally aligned and transversely spaced release locations 73 of the seed meter 5a (FIG. 5A) with the parallel seed disks 53, 57. The seed meter 5c of FIG. 2C with the longitudinally arranged metering assemblies 26 has release locations 73 that are transversely aligned and longitudinally spaced with respect to each other. Regardless, and referring again to FIGS. 2A-2C, the release locations 73 are arranged to allow for dropping the seed 25 from the respective disk(s) 53, 57 through an outlet 79 of the seed meter housing 35 of the seed meter 5 and into an inlet 81 of a common single seed tube 83 (FIG. 3) that delivers the seed 25 onto the agricultural field, which allows for selective release of one of the seed types 25a, 25b at a given time and/or a given area of an agricultural field, as controlled by a control system 85.

Figure 6:
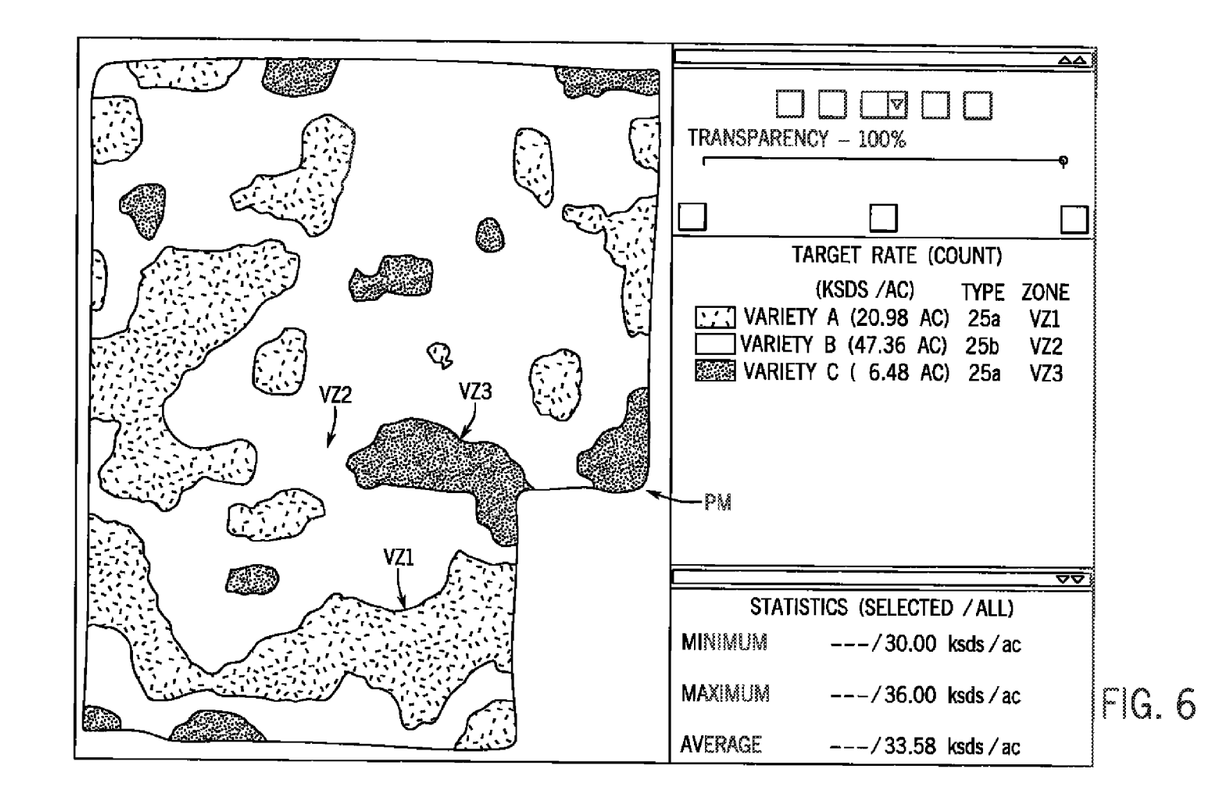
FIG. 6 illustrates a screen shot showing a seed-type prescription map for use with the planter incorporating the seed meter(s) in accordance with the present invention.

Referring now to FIGS. 2A-2C and 4, the control system 85 controls selective delivery of the seed types 25a, 25b out of the seed meters 5 and initial delivery of the seed types 25a, 25b from the compartments 31 of the bulk fill hoppers 29 to the first and second seed chambers 47, 49 of the seed meter reservoir 43. Control system 85 includes a planter controller 87 and a tractor controller 89 that operably communicate with each other, for example, by way of an ISOBUS connection, for coordinating controls of planter 9 such as the seed meters 5 and tractor 11 (FIG. 1) based on the type or variety zones VZ1, VZ2, VZ3 of the agricultural field, which may correspond to a seed type or variety prescription map PM as shown in FIG. 6.

Referring again to FIGS. 2A-2C, the planter controller 87 is shown including a controller 91 and a power supply 93. The controller 91 of the planter controller 87 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meter 5 and other components of the planter 9. The tractor controller 89 is configured for controlling operations of the tractor 11 such as controlling steering, speed, braking, shifting, and other operations of the tractor 11. The tractor controller 89 is shown as including a controller 95 and power supply 97. The tractor controller 89 is configured for controlling the functions of the tractor 11 by controlling the various GPS steering, transmission, engine, hydraulic, and/or other systems of the tractor 11. Like the controller 91 of the planter controller 87, the controller 95 of the tractor controller 89 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 11. A tractor interface system 99 is operably connected to the tractor controller 89 and includes a monitor and various input devices to allow an operator to see the statuses and control various operations of the tractor 11 from within the cab of the tractor 11. The tractor interface system 99 may be a MultiControl Annrest™ console available for use with the Maxxum™ series tractors from Case IH.

Figure 4:
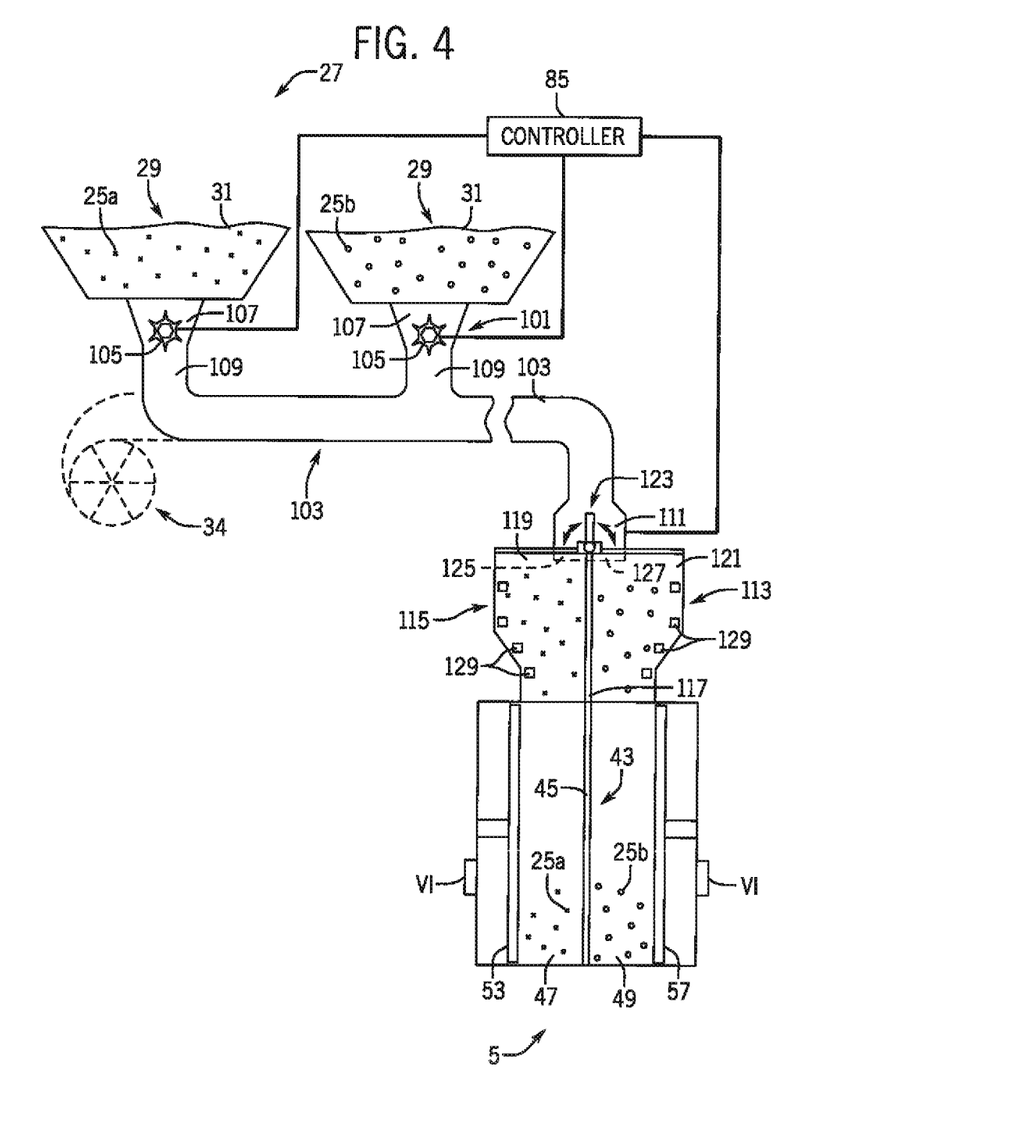
FIG. 4 illustrates a simplified schematic view of a variant of the seed meter shown in FIG. 2A.

Referring now to FIG. 4, the control system 85 controls the loading of the seed types 25a, 25b and the first and second seed chambers 47, 49 of the seed meter reservoir 43 by controlling a primary feed system 101, which allows for use of a single primary seed conduit 103 to selectively direct the different seed types 25a, 25b into the different seed chambers 47, 49. Primary feed system 101 includes seed metering rollers 105 which may be calibrated fluted rollers arranged at outlets 107 of the bulk fill hoppers 29, or the separate compartments 31 of a single bulk fill hopper 29 that holds both of the seed types 25a, 25b in its separate compartments 31. The rollers 105 are driven to rotate by electric, pneumatic, or hydraulic motors (not shown) as controlled by the control system 85 to control release of the seed varieties 25a, 25b from the respective compartments 31 into a conduit segment 109 that connects to the primary seed conduit 103. As shown in FIG. 4, in this embodiment, the primary seed conduit 103 connects to an inlet 111 of an on-row storage system 113 that includes a vented mini-hopper 115. The mini-hopper 115 has a separator wall 117 that divides its interior space to split compartments, shown as first and second mini-hopper chambers 119, 121 which feed into and are connected with the first and second seed chambers 47, 49 of the seed meter reservoir 43. The control system 85 selectively fills and maintains seed pool level of the first and second mini-hopper chambers 119, 121 by controlling a gate 123 of the primary feed system 101 arranged in the inlet 111 of the on-row storage system 113. Gate 123 is shown as a pivoting blade that can be actuated by an actuator (not shown) controlled by the control system 85 to permit or prevent flow through the inlet 111 into the first and second mini-hopper chambers 119, 121 by blocking or leaving uncovered corresponding openings 125, 127. Seed level sensors 129 are arranged in the first and second mini-hopper chambers 47, 49, 119, 121 to provide signals allowing the control system 85 to evaluate how much seed 25 of the seed types 25a, 25b is in the first mini-hopper chamber 119 and second mini-hopper chamber 121. In this way, the compartments 3 of the centrally located bulk fill hopper(s) 29 feed and maintain adequate fill level(s) of the seed varieties 225a and 25b in the first and second mini-hopper chambers 119, 121, as controlled by the control system 85.

Figure 5:
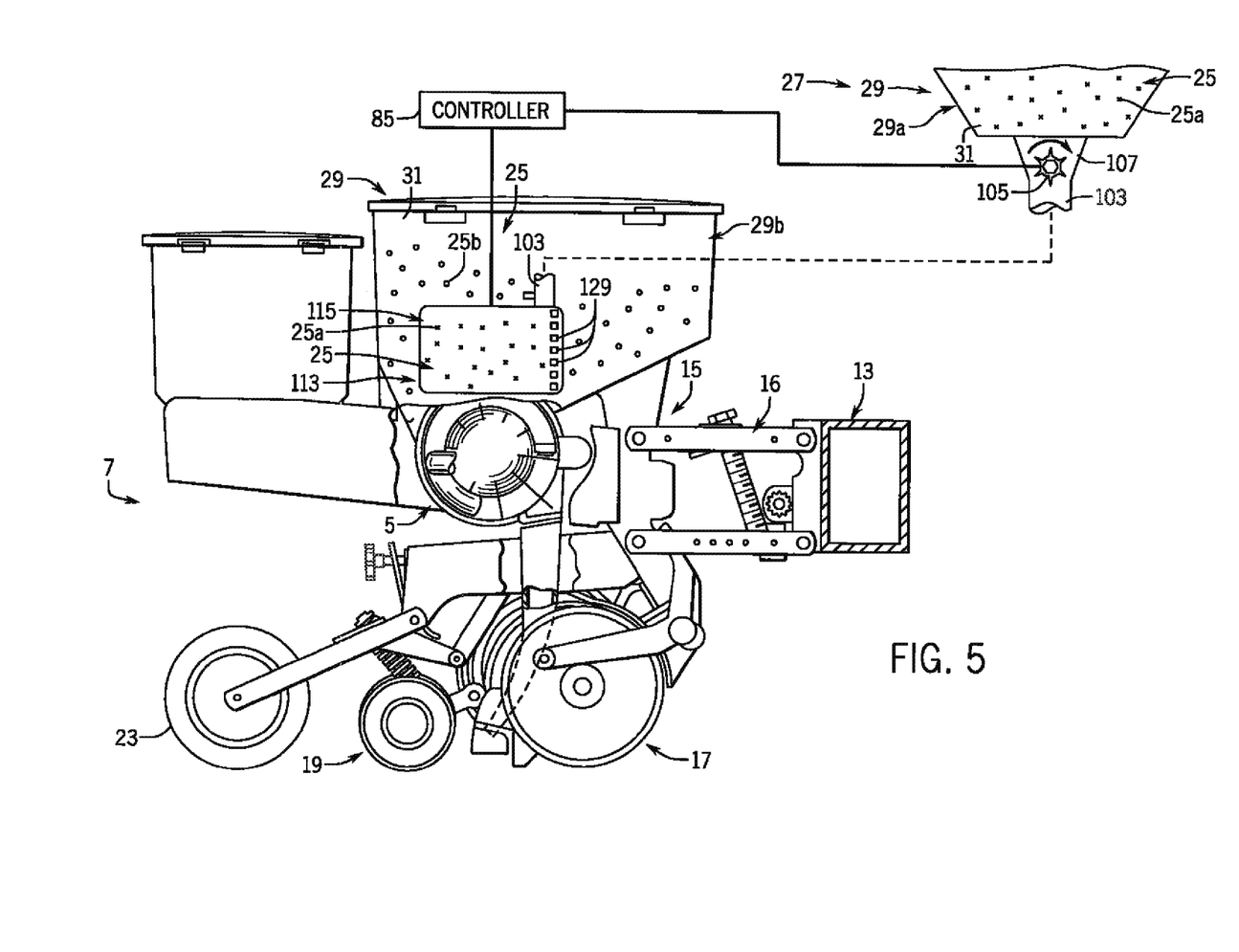
FIG. 5 illustrates a simplified side elevation view of a variant of the seed meter shown in FIG. 2A.

Referring now to FIG. 5, this is a variation of the system described above with respect to FIG. 4 that includes both remote centrally located bulk storage and on-row bulk storage of seed 25. Instead of storing all of the seed types 25a, 25b in centrally located bulk fill hoppers 29, FIG. 5 shows a variation in which only a seed type with a greater required use-volume seed type(s), shown as seed type 25a corresponding to a primary seed type, is stored in a compartment 31 of the centrally located bulk fill hopper(s) 29 represented as seed type 25a stored in bulk fill hopper 29a. A relatively lesser required use-volume seed type(s), shown as seed type 25b as a secondary seed type, is stored in bulk on-row in the compartment 31 of the on-row bulk fill hopper 29, represented as bulk fill hopper 29b. In this embodiment, within each seed meter 5, one of the seed disk assemblies 51, 55 is fed the primary seed type 25a from the mini-hopper 115, which itself pneumatically receives the primary seed type 25a from the remote and centrally located storage of the bulk fill hopper 29a. The other one of the seed disk assemblies 51, 55 is gravity-fed the secondary seed type 25b from the on-row bulk fill hopper 29b.

Referring again to FIGS. 2A-2C, regardless of the particular location(s) of bulk storage of the seed 25, the control system 85 is configured to control each seed meter 5 to switch, for example, absolutely, instantaneously, and automatically, between planting of different types or varieties of seed during a single planting pass of row-crop planting of an agricultural field with the planter 9. This may be done according to predetermined criteria, for example, based on the variety zones VZ1, VZ2, VZ3 of the agricultural field provided by the seed type or variety prescription map PM (FIG. 5), to accommodate selectively planting the seed types 25a, 25b based at least in part by characteristics relating to the soil type(s) and management type(s) of the variety zones VZ1, VZ2, VZ3. The control system 85 can absolutely and instantaneously switch which one of the seed types 25a, 25b is being planted by activating and/or deactivating the seed disk assemblies 51, 55 to shut off half of the seed meter 5 and only deliver seed 25 from the half of the seed meter 5 that is not shut off, in a precisely synchronized manner.

Still referring to FIGS. 2A-2C, each seed meter 5 has a seed disk drive system 131 that is controlled by the control system 85 for selectively activating and/or deactivating the seed disk assemblies 51, 55. As shown in FIG. 2A, the seed meter 5a with the parallel and transversely aligned seed disks 53, 57 is shown with mechanical chain drives 133 that deliver rotating driving power from a rotating shaft 135 through clutches 137 and chains 139, which rotate sprockets that are attached to spindles 141 that drive rotation of the seed disks 53, 57. Clutches 137 may be, for example, air clutches or electromechanical clutches, noting that the corresponding drives may include pneumatic motors or electric motors. Regardless, the control system 85 is operably connected to each of the clutches 137 to either disengage and prevent transmission of the rotation driving power from the shaft 135 or engage and permit transmission of the rotation driving power from the shaft 135 to each of the seed disks 53, 57. This selectively rotates the seed disks 53, 57 in a direction toward the forward facing wall 75 to convey the seed 25a, 25b from the first and second chambers 47, 49 for release into the seed tube 83. As shown in FIG. 2B, in the seed meter 5b with the transversely aligned and angled seed disks 53, 57, the seed disks 53, 57 are also rotated in a direction toward the forward facing wall 75 to convey the seeds 25a, 25b from the first and second seed chambers 47, 49 for release into the seed tube 83. As shown in FIG. 2C, in the seed meter 5c with the longitudinally aligned seed disks 53, 57, the seed disk 53 is rotated away from the forward facing wall 75 and the seed disk 57 is rotated toward the forward facing wall 75 to respectively convey seeds 25a, 25b from the first and second seed chambers 47, 49 toward the seed tube 83 in a central portion of the seed meter 5c. In FIGS. 2B-2C, each of the seed meters 5b, 5c is respectively shown with a direct drive-type seed disk drive system 131 having motor drives 143. The motor drives 143 may include pneumatic motors or electric motors that rotate the spindles 141, driving rotation of the seed disks 53, 57. It is understood that the motor drives 143 may instead rotate the seed disks 53, 57 by rotating hubs, outer peripheries, or other portions of the seed disks 53, 57. Regardless, the control system 85 is operably connected to each of the motor drives 143 to either disengage and prevent transmission of the rotation driving power from the motor drives 143 or engage and permit transmission of the rotation driving power from the motor drives 143 to each of the seed disks 53, 57.

Referring now to FIGS. 2A-2C and 6, during use, an operator first displays the seed type or variety prescription map PM (FIG. 6) on the computer display or monitor of the tractor interface system 99, which would typically be inside the tractor cab. The prescription map PM displays which type or variety zones VZ1, VZ2, VZ3 are where in the agricultural field and which seed types 25a, 25b can be planted in the variety zones VZ1, VZ2, VZ3. As shown in FIG. 6, in this embodiment, seed type 25a is shown as acceptable for use in variety zones VZ1 and VZ3, corresponding to recommended varieties A and C. Seed type 25b is shown as acceptable for use in variety zone VZ2, corresponding to a recommended variety B. The operator inputs which seed type 25a, 25b is stored in compartments 31 of the bulk storage system 27 through the tractor interface system 99. The prescription map PM may also contain the seed population that is to be planted for each type or variety 25a, 25b. The seed population could also be varied within the field based on soil type, organic matter, etc. The size of the seeds can also be input into the tractor interface system 99. This information could also be made available in the database that is built from the desktop software when the prescription map PM was created.

Referring again to FIG. 4, the control system 85 then determines seed level in each of the first and second mini-hopper chambers 119, 121 based on a signal(s) from the corresponding seed level sensors 129. If the seed level in the first and second mini-hopper chambers 119, 121 is below a certain predetermined level corresponding to an amount needed for making at least one planting pass or starting planting, then the control system 85 sends a signal to rotate the metering roller(s) 105 of the compartment 31 holding the seed type 25a, 25b that was determined to be low. This releases the particular low seed type(s) 25; 25b through the primary seed conduit 103. The control system 85 also sends a signal to actuate the gate 123 at the inlet 111 of the on-row storage system 113 to ensure that the seed type 25; 25b released from the bulk storage system 27 is directed to the correct one of the first and second mini-hopper chambers 119, 121 of the mini-hopper 115.

Referring again to FIGS. 2A-2C, by way of the GPS of the tractor controller 89, the control system 85 is able to determine which seed type 25a, 25b is to be planted by each of the seed meters 5 based on the prescription map PM (FIG. 6). For example, if seed type 25a is to be planted from a particular row unit 7 of the planter 9, the control system 85 activates the seed disk drive system 131 that activates the seed disk assembly 51 and rotates and delivers seed 25 of seed type 25a from the seed disk 53 and deactivates the seed disk drive system 131 that deactivates the seed disk assembly 55 and prevents rotation of and delivery of seed 25 of seed type 25b from the seed disk 57 at that particular row unit 7. This synchronized activating and deactivating of the seed disk assemblies 51, 55 provide a seed-type switching event. During the seed-type switching event, which may correspond to the planter 9 and/or tractor 11 crossing from one variety zone to another according the prescription map PM (FIG. 5) and detected by the GPS of the tractor controller tractor controller 89, release of a final seed 25 of the previously planted type is sequentially followed by an initial seed 25 of a subsequent or currently planted seed type. This can be done within a single row without creating a skip event, maintaining a constant in-row seed spacing through the seed-type switching event, whereby an in-row seed spacing at a transition between the first and second seed types is the same as the in-row seed spacing within each of the first and second seed types 25*a*, 25*b*.

Still referring to FIGS. 2A-2C, the control system 85 can be configured to individually control each of the seed meters 5 in this way to control switching from delivering seeds 25 of the first seed type 25*a* to delivering seeds 25 of the second seed type 25*b* on a per-row basis. In another embodiment, the control system 85 is configured to control groups of seed meters 5 in the same way within the same section of the planter 9, for example, by giving common commands to all of the seed meters 5 within the same outer wing section(s) and/or inner or middle sections. This allows the control system 85 to control switching from delivering seeds 25 of the first type 25*a* to delivering seeds 25 of the second seed type 25*b* from the planter on a per-section basis. In yet another embodiment, the control system 85 is configured to control all of the seed meters 5 of the planter 9 in the same way. This allows for controlling switching from delivering seeds 25 of the first seed type 25*a* to delivering seeds 25 of the second seed type 25*b* on a whole-planter basis.

Many changes and modifications could be made to the invention without departing from the spirit thereof. The scope of these changes will become apparent from the appended claims.

We claim:

1. A seed meter for planting multiple types of seed in a single planting pass during row-crop planting of an agricultural field, the seed meter comprising:

a housing supported relative to a row unit of a planter and including a first seed chamber, a second seed chamber and a separator wall separating the first and second seed chambers from each other;

a first seed disk rotatable within the housing and having a first side communicating with the first seed chamber, the first seed disk conveying seeds of a first type through the housing and out of the seed meter;

a second seed disk rotatable within the housing and having a first side communicating with the second seed chamber, the second seed disk conveying seeds of a second type through the housing and out of the seed meter; and a seed disk drive system activating and deactivating the first and second seed disks for selectively delivering a corresponding one of the first and second seed types out of the housing for planting of an agricultural field.

2. The seed meter of claim 1 wherein the separator wall is arranged transversely between the first and second seed disks with the first seed chamber between the separator wall and the first seed disk and the second seed chamber between the separator wall and the second seed disk.

3. The seed meter of claim 1 wherein the first and second seed disks are arranged generally parallel to each other.

4. The seed meter of claim 1 wherein the first and second seed disks are arranged at an angle with respect to each other.

5. The seed meter of claim 1 further comprising a seed tube receiving seeds released from both the first and second seed disks for delivery onto the agricultural field.

* * * * *